United States Patent Office 3,336,409
Patented Aug. 15, 1967

3,336,409
METHOD FOR THE PRODUCTION OF ALKYLATED STYRENE POLYMERS
Donald H. Russell, Cherry Hill, N.J., and Benjamin C. Wilbur, Jr., Philadelphia, Pa., assignors to Atlantic Richfield Company, Philadelphia, Pa., a corporation of Pennsylvania
No Drawing. Filed July 15, 1966, Ser. No. 565,398
10 Claims. (Cl. 260—669)

This application is a continuation-in-part of our copending application Ser. No. 416,642, filed Dec. 7, 1964, now abandoned, entitled, "Method for the Production of Alkylated Styrene Polymers."

This invention relates to the production of normally liquid low molecular weight alkylated styrene polymers and more particularly it relates to a process for the simultaneous polymerization and alkylation of styrene monomers to produce low molecular weight liquid polymers.

It is well known to alkylate polystyrene by reacting an olefin or a monochloroparaffin with a polystyrene having a molecular weight in the range of from 10,000 to as high as 1,000,000 in the presence of a Friedel-Crafts catalyst utilizing chlorinated hydrocarbons or nitrated hydrocarbons as the solvent, e.g. chlorobenzene, dichlorobenzene, carbon tetrachloride, nitrobenzene and the like. Although, as shown by the description of these prior processes for the alkylation of polystyrene, considerable attention is given to controlling the temperature, catalyst concentration and particular solvents in order to prevent degradation of the polymer during alkylation, nevertheless degradation occurs with the concurrent production of a dark colored product of rather limited use. Moreover, this degradation is also accompanied by rather poor yields and accordingly the alkylation of polystyrenes by these methods has not come into widespread use on a commercial basis.

It now has been found that normally liquid low molecular weight alkylated styrene polymers of high quality which range in color from water-white to a light straw color can be produced by a process involving simultaneous alkylation and polymerization reactions.

It is an object of this invention to provide a method for the production of normally liquid low molecular weight alkylated styrene polymers.

It is another object of this invention to provide a method for the production of normally liquid low molecular weight styrene polymers by simultaneous alkylation and polymerization reactions.

It is another object of this invention to provide a method for the production of normally liquid low molecular weight alkylated styrene polymers which are not degraded and are light in color.

In accordance with the process of this invention a styrene monomer and an alkylating agent selected from the group consisting of straight chain alpha monoolefins and straight chain monochloroparaffins in a $C_6$ to $C_{12}$ paraffinic hydrocarbon solvent are contacted with an aluminum chloride catalyst at a temperature in the range from 50° F. to 200° F. for a time in the range from 5 minutes to 6 hours. After the desired reaction period the reaction is terminated and the alkylated styrene polymer is recovered and purified.

The styrene monomers which may be utilized in the preparation of the alkylated styrene polymers of this invention are styrene, alpha-methylstyrene, alpha-methyl para-methylstyrene, para-methylstyrene (vinyl toluene) and mixtures of these monomers.

The alkylating agents which are utilized in this invention are straight chain alpha-olefins containing from 4 to 17 carbon atoms, particularly the straight chain alpha-monoolefins produced by the cracking of petroleum waxes, the monochloroparaffins containing from 4 to 17 carbon atoms in the molecule, in particular the straight chain compounds produced by monochlorinating straight chain paraffinic hydrocarbons. Either a pure compound may be employed or a mixture of these compounds may be employed.

The catalyst which is utilized in this invention is aluminum chloride. It is preferable to employ the anhydrous compound and add sufficient water to the paraffinic hydrocarbon solvent to activate the catalyst. Other methods of activating the catalyst can be employed with the same results, for example, the catalyst can be allowed to contact moist air for sufficient time to activate it. In general only a few minutes are required.

The solvent for the styrene monomers and the alkylating agent are the paraffins containing 6 to 12 carbon atoms in the molecule. These paraffins also can be utilized as the slurrying medium for the aluminum chloride catalyst. Particularly preferred solvents are normal heptane and isooctane, although any saturated $C_6$ to $C_{12}$ hydrocarbon including cycloparaffins and alkylated cycloparaffins as well as mixtures of these various $C_6$ to $C_{12}$ paraffinic hydrocarbons may be employed. The solvent is utilized as a medium for controlling the temperature since the alkylation-polymerization reactions are highly exothermic.

Since the solvent provides the reaction medium it is preferable to add sufficient water to it to activate the catalyst, i.e. an amount such that there is a mole ratio of water to $AlCl_3$ of from 1:2 to 1:30, preferably from 1:7 to 1:15.

In one embodiment of the invention the styrene monomer and alkylating agent are dissolved in the paraffinic hydrocarbon solvent containing an amount of water sufficient to activate the aluminum chloride catalyst. The solution is heated to reaction temperature and the anhydrous catalyst is added. At low reaction temperatures of from 50° F. to 100° F. the reaction proceeds very slowly and reaction times as long as six hours may be required in order to obtain a conversion of 98 percent with a catalyst concentration of 0.015 mole per liter, based on the total volume of solvent, styrene monomer and alkylating agent. At a reaction temperature of about 150° F. the reaction proceeds more rapidly so that in order to obtain 98 percent conversion of the reactants a reaction time of only about one hour is required with the same catalyst concentration. At 200° F. the reaction proceeds with such rapidity that it is necessary to reduce the catalyst concentration, preferably to about one-third of that above-mentioned, i.e. about 0.005 mole per liter based on the total volume of solvent, styrene monomer and alkylating agent and employ external cooling in order to avoid an explosive reaction. Under these conditions the reaction will be substantially complete at the end of five minutes. At the end of the desired reaction period the reaction is terminated and the polymer recovered as will be described.

In a second embodiment of the instant invention the aluminum chloride catalyst is slurried in the solvent which contains a sufficient quantity of water to activate the catalyst. Solvent and catalyst are heated to reaction temperature and the mixture of styrene monomer and alkylating agent is added to the catalyst slurry. If a low reaction temperature is employed the styrene monomer and alkylating agent may be added rather rapidly without raising the temperature of the reaction mixture to such an extent that external cooling is required. If, however, temperatures in the 80° F. to 200° F. range are employed, it is necessary to add the reactants very slowly, substantially dropwise, unless a considerable amount of external cooling is utilized to control the temperature. Upon completion of the addition of the reactants, agitation of the mixture is continued until the desired conversion is obtained, thereafter the reaction is terminated and the alkylated polymer is recovered.

It has been found that the styrene monomer to alkylating agent mole ratio may range from 1:2 to 10:1. If the quantity of styrene monomer is less than that for a 1:2 mole ratio, there will be an excess of unreacted alkylating agent in the reaction medium after the styrene has polymerized. If the quantity of styrene monomer is greater than that for a 10:1 mole ratio there will be such an excess of styrene that the product will be predominantly polystyrene with only exceedingly small amounts of alkylation. Preferably the mole ratio of styrene monomer to alkylating agent is in the range of 1:1 to 4:1.

The reaction temperature range suitable for producing the alkylated styrene polymers in the process of this invention is from 50° F. to 200° F. and preferably from 80° F. to 150° F. Only the polymerization reaction occurs at temperatures below 50° F. since at these lower temperatures the alkylation reaction is almost entirely absent. The products obtained, therefore, when the reaction is carried out at temperatures below about 50° F. are the polymers of the styrene monomers. At temperatures above 200° F. the reaction becomes uncontrollable for all practical purposes. The most desirable range from the standpoint of controlling the reaction and obtaining a high conversion in a reasonable length of time is from 80° F. to 150° F.

The reaction time is a function of the reaction temperature as has been described. Thus, for reaction temperatures at the upper end of the temperature range, reaction times as short as from 5 to 15 minutes are sufficient. When the reaction temperature is at the lower end of the temperature range, the longest times are required, i.e. from about 5 to 6 hours. In general, the reaction temperatures between 80° F. and 150° F. and times of from 5 hours to one hour are sufficient. Since reaction time is also a function of the degree of conversion the times referred to are the conversions of at least 95 percent of the reactants into alkylated polymers.

As has been described, since the reactions are exothermic the reaction temperature can be controlled more readily by the use of a solvent. When low reaction temperatures are employed and the reactants are added dropwise to a slurry of the catalyst in the solvent, the amount of solvent utilized may be equal in volume to the volume of reactants added. At higher reaction temperatures, e.g. 150° F., it is preferable that the solvent constitute at least 70 volume percent of the total mixture of solvent and reactants, and more preferable the amount of solvent should be from 80 volume percent to 90 volume percent of the total mixture of solvent and reactants.

The mole ratio of styrene to catalyst ranges from 4:1 to 60:1 depending upon the reaction temperature employed and, to some extent, upon the concentration of the reactants in the solvent. It is preferable to use less catalyst when higher temperatures are employed and more concentrated solutions are used. With lower temperatures or more dilute solutions, higher catalyst concentrations are suitable. A convenient and useful mole ratio of styrene monomer to catalyst is 16:1.

Vigorous agitation should be employed during the reaction in order to insure a uniform product and also to aid in controlling the reaction temperature. As has been mentioned, it may be necessary to control the reaction temperature by the use of external cooling such as the use of a jacketed reaction vessel or a reaction vessel provided with cooling coils immersed in the reaction medium.

At the end of the desired reaction period the reaction is terminated by the addition of aqueous methanol containing 5 volume percent concentrated hydrochloric acid or by the use of aqueous isopropanol containing 5 volume percent concentrated hydrochloric acid. These solutions destroy the activity of the catalyst substantially instantaneously and thereafter the organic layer is washed with several successive volumes of water to a very low ash content. The organic layer is separated from the final wash water and is fractionated to remove solvent and unreacted hydrocarbons. In general, all of the styrene monomer is converted into polymer, and only when the styrene monomer to alkylating agent mole ratio is at the low end of the range, i.e. in the direction of the 1:2 limit, will there be any substantial quantities of unreacted alkylating agent present in the reaction mixture.

The reaction products produced in accordance with the process of this invention were analyzed by means of solvent chromatography, infrared spectroscopy, nuclear magnetic resonance spectroscopy, molecular weight determination, refractive index, viscosity and boiling range.

It was found that when aluminum chloride is utilized as the catalyst and the alkylating agents are either straight chain alpha monoolefins or straight chain monochloroparaffins there is no homopolymerization of the monomers or copolymerization of the alkylating agent and styrene monomer under the process conditions of the invention. It also was found that substantially all of the alpha monoolefin alkylating agent reacted to give monoalkylated products, primarily in the para position, except when that position on the ring was already substituted, as in the case when the monomer employed was paramethyl styrene or alphamethyl paramethyl styrene. The exception to monoalkylation occurs when the styrene monomer to alpha monoolefin mole ratio is less than 1:1, i.e. toward the limit of 1:2. When the alpha monoolefin is in molar excess over the styrene monomer a certain amount of dialkylation is obtained, depending upon the excess, although it has been found that after there has been one alkyl radical substituted on the ring it is more difficult to substitute the second alkyl radical onto the ring.

When a monochloroparaffin, i.e. a straight chain alkyl monochloride, is utilized as the alkylating agent, substantially the same reactions occur as have been enumerated when a straight chain alpha monoolefin is utilized as the alkylating agent.

The polymers produced in accordance with the process of this invention when styrene is utilized as the polymerizable monomer may be represented by the structural formula

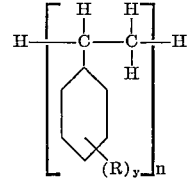

wherein R is an alkyl radical having from 4 to 17 carbon atoms, $n$ is the number from 3 to 15, inclusive, and $y$ is 0.1 to 2.0. When the mole ratio of styrene to alkylating agent is 1:2, $y$ will have a value of approximately 2 indicating that each monomeric unit of the styrene polymer is, on the average, dialkylated. When the mole ratio of styrene to alkylating agent is 1:1, the compound obtained will have a value of approximately one for $y$, indicating that each monomeric unit of the polymer is monoalkylated. If a mole ratio of styrene to alkylating agent of 10:1 is utilized, $y$ will have a value of 0.1 indicating that on the average only one monomeric unit out of ten is monoalkylated.

If the styrene monomer is alphamethyl styrene the resulting polymer may be represented by the formula

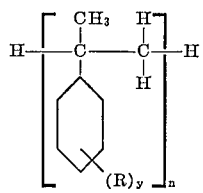

wherein R, y and n have the same designations as in the formula set forth previously. If paramethyl styrene (vinyl toluene) is utilized as the styrene monomer the polymers produced may be represented by the structural formula

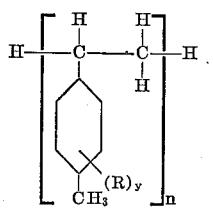

wherein R, y and n have the same designations as in the formula set forth for styrene as the monomer.

Mixtures of styrene monomers may be employed to give alkylated copolymers, for example, styrene with alphamethylstyrene, or styrene with vinyl toluene. In general, when styrene is copolymerized either with para-methylstyrene or with alpha-methyl para-methyl styrene the alkylation will occur first on the styrene units since these are more readily alkylated than the rings where the para position is already occupied, such as by a methyl group.

The polymers produced according to the process of this invention have a number average molecular weight from about 300 to about 1500. They are oils at room temperature, the lower molecular weight polymers having a low viscosity, i.e. they are quite fluid at room temperature, whereas the polymers in the 1200 to 1500 number average molecular weight range are thick and highly viscous liquids at room temperature.

The following examples are provided to illustrate specific embodiments of the invention and are not to be construed as limiting the invention thereto.

*Example I*

Styrene monomer was percolated through neutral chromatography grade alumina at room temperature to obtain a pure monomer. Normal heptane also was percolated through neutral chromatography grade alumina at room temperature to obtain a clean solvent. Alpha-olefins containing from 8 to 10 carbon atoms in the molecule obtained by the cracking of petroleum wax were utilized as the olefinic hydrocarbon. These olefins had an average molecular weight of 126. One half mole of styrene (52 grams) and one half mole (63 grams) of the olefins were dissolved in 100 grams of the purified heptane. This solution was added dropwise during a period of 4½ hours to a slurry of 4.2 grams of aluminum chloride in 200 grams of normal heptane. This quantity of catalyst gave a styrene to catalyst mole ratio of 16:1. This catalyst had been activated by contact with moist air. The temperature was maintained at between 75° F. and 82° F. and the reaction mixture was vigorously agitated during the addition of the reactants. The reaction mixture was stirred for an additional 30 minutes after addition of the reactants to the mixture and the reaction was terminated by the use of methanol containing concentrated hydrochloric acid. The alcohol layer containing the acid was decanted from the organic layer and the residual solvent was stripped from the oily polymer. The alkylated styrene polymer had a refractive index at 29.3° C. of 1.5319. The alkyl radicals which had been substituted onto the benzene rings of the polymer had from 8 to 10 carbon atoms in the radical.

*Example II*

A run identical to that of Example I was carried out except that the styrene to olefin mole ratio was 2:1. The styrene to catalyst mole ratio employed was 16:1. The crude polymer product had a refractive index at 29.5° C. of 1.5661. The crude polymer which had a number average molecular weight of 840 was fractionated by solvent chromatography. The lowest molecular weight fraction had a moelcular weight of 519. An intermediate molecular weight fraction had a molecular weight of 1115 and the highest molecular weight fraction had a molecular weight of 2285. The highest molecular weight fraction was found to be almost entirely polystyrene with only .5 percent of the molecules being alkylated. Accordingly, the alkylated polystyrene polymer product was predominantly in the 500 to 1500 molecular weight range and the alkyl radicals had from 8 to 10 carbon atoms.

*Example III*

A run identical to that of Example II was carried out using a boron trifluoride-etherate complex as the catalyst instead of the aluminum chloride. During the dropwise addition of the styrene and $C_8$–$C_{10}$ alpha monoolefin fraction to the catalyst solution a yellow precipitate formed. After a reaction time of 3 hours the reaction was stopped by the addition of aqueous HCl.

The solids were dissolved in benzene and both the benzene solution and the organic layer (heptane, unreacted reactants and product) were added, after drying over $MgSO_4$, to methanol to give insoluble products.

The products were analyzed by nuclear magnetic resonance spectroscopy and both were found to be polystyrene, not alkylated. The molecular weight of the benzene soluble product was 2752 and that of the product from the organic layer was 1795. This run shows that a $BF_3$-etherate catalyst does not give an alkylated polystyrene product.

*Example IV*

A run was carried out using the identical process of Example I except that the styrene to olefin mole ratio was 4:1. The styrene to catalyst mole ratio employed was 16:1. The alkylated polymer had a refractive index of 1.5640 at 30.8° C. On the average only 1 out of 4 of the rings of the styrene monomeric units were alkylated with an alkyl group having from 8 to 10 carbon atoms.

*Example V*

A series of runs were carried out utilizing the same process as described for Example I except that the straight chain alpha-olefins were in the $C_{11}$ to $C_{15}$ molecular weight range. These alpha-olefins also were produced by the cracking of petroleum wax. Experiments were carried out wherein the styrene to olefin ratio was 1:1, 2:1 and 4:1. As a comparison a pure $C_{12}$ straight chain alpha-olefin was also utilized in a styrene to olefin mole ratio of 2:1. It was found that as the amount of olefin decreased in relation to the styrene the amount of alkylation of the polymer also decreased correspondingly although the alkylation was monoalkylation in all the products.

*Example VI*

A run was carried out using the process described in Example I, except that the cracked-wax alpha-olefin was in the $C_{16}$ to $C_{17}$ range. In this experiment a 4:1 styrene to olefin mole ratio was employed and an alkylated polymer was obtained which corresponded to the products obtained in the previous examples for similar styrene to olefin mole ratios.

*Example VII*

There was charged to a round bottom flask reactor a slurry consisting of 100 grams of alumina percolated normal heptane and 2.1 grams of aluminum chloride which had been activated in moist air.

To this slurry was added dropwise a solution consisting of 26 grams of alumina percolated styrene and 9.5 grams of butene-1 in 50 grams of purified normal heptane. The addition required 1.5 hours and the temperature increased from 77° F. to 106° F. The system was allowed to react an additional 2 hours and then the reaction was stopped by the addition of aqueous HCl.

The organic layer was separated and dried over $MgSO_4$ then added to 2 liters of methanol to give a yellow insoluble product. This product was analyzed by nuclear magnetic resonance spectroscopy and found to be alkylated polystyrene with two butyl radicals per three styrene groups.

Example VIII

A run identical to that of Example VII was carried out except that 7.0 grams of isobutylene was utilized instead of the butene-1 and the addition was started at about 20° F. in order to avoid the use of pressure equipment to maintain the liquid phase and also to prevent a violent reaction. After addition the reactants were allowed to warm to 77° to 80° F. and the system reacted at this temperature for 1.5 hours. After stopping the reaction the organic layer was separated from the aqueous layer, dried over $MgSO_4$ and then the organic material was added to methanol. An oily precipitate was formed which was dissolved in benzene and reprecipitated from methanol. This product was found by nuclear magnetic resonance spectroscopy to be solely a copolymer of styrene and isobutylene with no alkylation. This shows that isobutylene cannot be used to give an alkylated styrene polymer by the process of this invention.

Example IX

A sample of the styrene without the olefinic hydrocarbon was polymerized in the manner described in Example I. The recovered polymer was tested for compatibility in a fully refined paraffin wax and was found to be incompatible with the wax, i.e. after being incorporated in the melted wax, it exuded from the solid wax.

The alkylated styrene polymers prepared in accordance with this invention, for example, those of Examples I, II, IV, V, VI etc. were found to be compatible with the fully refined paraffin wax (154° F. melting point).

Example X

Styrene monomer and n-heptane were purified as described in Example I. A 2 mole portion of the purified styrene and a 1 mole sample of 1-chlorododecane were dissolved in 150 ml. of the purified n-heptane. The solution was added to 16.8 grams of $AlCl_3$ catalyst (activated by moist air) which had been slurried in 500 ml. of the purified n-heptane. The addition time required for adding the styrene and 1-chlorododecane solution was one hour, and an additional two hours of reaction time was utilized. The reaction temperature range was from 77° F. to 90° F. At the end of the three hours, 200 ml. of water was added to the reaction mixture in order to stop the reaction and the organic layer was poured into 6 liters of methanol. A yield of 212 grams of the alkylated styrene polymer in the form of a yellowish oil was obtained. This product was found to have a molecular weight of approximately 530 and, was found to be wax compatible.

Example XI

A large scale experiment was carried out wherein alpha-olefins in the $C_6$–$C_8$ molecular weight range obtained by the cracking of paraffin waxes were admixed with purified styrene in a mole ratio of styrene to olefin to 2.5:1 and added to a n-heptane slurry of aluminum chloride. The volume percent n-heptane was 80 percent of the total volume of heptane together with the styrene and alpha-olefins. Catalyst concentration was 0.06 mole per liter of the total solution, the water concentration in the heptane solution was 0.002 mole per liter and the reaction temperature was 80° F. The styrene-olefin mixture was added over a period of 255 minutes and allowed to react a total of 345 minutes. At the end of this time the reaction was terminated by the addition of an aqueous isopropyl alcohol containing concentrated hydrochloric acid in the proportions 50 volume percent isopropyl alcohol, 45 volume percent water, 5 volume percent concentrated hydrochloric acid solution. The organic layer was then washed with several successive volumes of water to remove substantially all of the catalyst and thereafter the organic layer was stripped to remove solvent and unreacted monomers. An overall conversion on a no-loss basis of 99.8 percent was obtained. The alkylated styrene polymer had a molecular weight of 590.

Example XII

A mixture of $C_8$ to $C_{10}$ alpha-olefins produced by the cracking of petroleum wax as described in Example I, and styrene in a mole ratio of styrene to olefin of 2:1 was added to a slurry of aluminum chloride in n-heptane, the amount of n-heptane being 80 volume percent of the total volume of heptane, styrene and olefin. The catalyst concentration was 0.06 mole per liter and the water concentration was 0.002 mole per liter based on the total solution of heptane and reactants. A reaction temperature of 80° F. was utilized and the reactants were added over a period of 270 minutes with a total reaction time of 300 minutes. The reaction was terminated and the alkylated polymer purified and recovered in the manner described in Example XI. The alkylated styrene polymer had a number average molecular weight of 660.

Example XIII

A mixture of $C_{15}$–$C_{17}$ alpha-olefins produced by the cracking of petroleum wax as described in Example I and styrene in a mole ratio of styrene to olefin of 6:1 was added to a slurry of aluminum chloride in normal heptane, the amount of normal heptane being 80 volume percent of the total volume of heptane, styrene and olefin. The catalyst concentration was 0.015 mole per liter and the water concentration was 0.002 mole per liter based on the total solution of heptane and reactants. A reaction temperature of 120° F. was utilized and the reactants were added over a period of 120 minutes with a total reaction time of 180 minutes. The reaction was terminated and the alkylated polymer purified and recovered in the manner described in Example XI. An overall conversion on a no-loss basis of 99.9 percent was obtained. The alkylated styrene polymer had a number average molecular weight of 760.

Example XIV

A mixture of styrene and $C_8$–$C_{10}$ alpha-olefins with a mole ratio of styrene to alpha-olefin of 2:1 was dissolved in normal heptane in an amount such that the volume of the normal heptane was 80 percent of the total volume of the solution. This solution was heated to 200° F. and aluminum chloride added in an amount such that the catalyst concentration was 0.005 mole per liter of solution. The water concentration in the solution was about 0.002 mole per liter. The reaction was continued for 15 minutes with external cooling in order to control it and thereafter it was terminated by the use of the aqueous isopropyl alcohol solution described in Example XI. The polymer was purified and recovered in the same manner as described in the Example XI and was found to have a number average molecular weight of 920, and was alkylated.

Example XV

A mixture of styrene and a $C_{15}$–$C_{17}$ alpha-olefin fraction with a mole ratio of styrene to alpha-olefin of 5.2:1 was dissolved in normal heptane in an amount such that the volume of the normal heptane was 80 percent of the total volume of the solution. This solution was heated to 100° F. and aluminum chloride added in an amount such that the catalyst concentration was 0.015 mole per liter of solution. The water concentration in the solution was 0.002 mole per liter. The reaction was continued for 360 minutes and thereafter it was terminated by the use of the aqueous isopropyl alcohol solution described in Example XI. The polymer was purified and recovered in the same manner as described in Example XI. An overall conversion of 100 percent was obtained. The alkylated styrene polymer was found to have a number average molecular weight of 1170.

*Example XVI*

One mole of styrene and one mole of vinyl toluene were admixed to give the styrene monomer fraction and these in turn were admixed with 0.5 mole of the $C_8$–$C_{10}$ alpha-olefin. This mixture of reactants was added to a n-hexane slurry of aluminum chloride which had been in contact with moist air, the amount of aluminum chloride being such that the mole ratio of the styrene monomers to the catalyst was 16:1. Reactants were added over a period of 2½ hours with vigorous agitation and this agitation was continued for an additional five minutes after the reactants had been added. Reaction temperature was maintained between 77° F. and 100° F. The reaction was terminated with water and after separating the water phase the solvent and unreacted monomers were stripped from the organic layer to yield an alkylated styrene polymer having a number average molecular weight of 685 and a viscosity at 275° F. of 57.73 centistokes. The polymer was found to be soluble in wax of 154° F. melting point. It was found by analysis that the vinyl toluene had polymerized with the styrene to produce a copolymer which was alkylated by the $C_8$–$C_{10}$ alpha-olefin.

*Example XVII*

In this experiment one mole of styrene was admixed with one mole of alpha-methylstyrene to give the styrene monomer fraction which was admixed with one mole of the $C_8$–$C_{10}$ alpha-olefins. This mixture of reactants was added to a n-heptane slurry of aluminum chloride (activated by moist air) in which the aluminum chloride was present in an amount such that the ratio of the styrene monomers to the catalyst was 16:1. The n-heptane was in an amount such that it gave approximately 80 volume percent solution based on the total volume of solvent and reactants. The reactants were added over a period of three hours with continuous agitation and thereafter the agitation was continued for an additional 20 minutes. The temperature was maintained between 86° F. and 104° F. Upon completion of the reaction product the reaction was terminated by the addition of water. Thereafter the polymer was recovered as described in Example XVI. It was found that the alpha-methylstyrene had formed a copolymer with the styrene and that the $C_8$–$C_{10}$ alpha-olefins had alkylated the copolymer. The number average molecular weight of the alkylated copolymer was 476. It had a viscosity at 200° F. of 15.98 centistokes and at 275° F. of 5.50 centistokes.

The alkylated styrene polymers produced in accordance with the process of this invention have been found to be particularly useful as additives for wax coating compositions, for example, a composition consisting of 53 weight percent fully refined paraffin wax (melting point 154° F.), 15 weight percent microcrystalline wax (melting point 175° F.), 25 weight percent of a copolymer of ethylene and vinyl acetate (polymerized vinyl acetate content 28 weight percent, melt index 2.9) and 7 weight percent of an alkylated styrene polymer such as that produced in Example XII was found to be an excellent coating for milk cartons. These alkylated polystyrenes apparently plasticize the wax-polymer compositions so that such compositions will have a sufficiently low viscosity to permit their use in existing wax-coating equipment.

We claim:

1. A process for the simultaneous polymerization and alkylation of styrene monomers to produce normally liquid low molecular weight alkylated styrene polymers wherein the polymer chain consists solely of styrene monomeric units with the alkylating agent forming a substituent on the benzene ring of the styrene monomeric unit which comprises contacting a styrene monomer and an alkylating agent selected from the group consisting of straight chain $C_4$ to $C_{17}$ alpha monoolefins and straight chain $C_4$ to $C_{17}$ monochloroparaffins in a $C_6$ to $C_{12}$ paraffinic hydrocarbon solvent with an aluminum chloride catalyst at a temperature in the range of from 50° F. to 200° F. for a time in the range of from 5 minutes to 6 hours, said monomer to said alkylating agent mole ratio being in the range of from 1:2 to 10:1, and thereafter recovering the alkylated polymer.

2. The process according to claim 1 wherein said styrene monomer is styrene and said alkylating agent is a straight chain $C_4$ to $C_{17}$ alpha monoolefin.

3. The process according to claim 1 wherein said styrene monomer is styrene and said alkylating agent is a straight chain $C_6$ to $C_8$ alpha monoolefin.

4. The process according to claim 1 wherein said styrene monomer is styrene and said alkylating agent is a straight chain $C_8$ to $C_{10}$ alpha monoolefin.

5. The process according to claim 1 wherein said styrene monomer is styrene and said alkylating agent is a straight chain $C_{11}$ to $C_{15}$ alpha monoolefin.

6. The process according to claim 1 wherein said styrene monomer is alpha-methylstyrene.

7. The process according to claim 1 wherein said styrene monomer is vinyl toluene.

8. The process according to claim 1 wherein said styrene monomer is styrene and said alkylating agent is a straight chain $C_4$ to $C_{17}$ monochloroparaffin.

9. The process according to claim 7 wherein the monochloroparaffin is 1-chlorododecane.

10. The process according to claim 1 wherein the temperature is in the range of from 80° F. to 150° F., the time is in the range of from 1 hour to 6 hours and said monomer to alkylating agent mole ratio is in the range of from 1:1 to 4:1.

References Cited

UNITED STATES PATENTS

| | | | |
|---|---|---|---|
| 2,474,881 | 7/1949 | Young et al. | 260—669 X |
| 2,655,549 | 10/1953 | Welch et al. | 260—669 X |
| 2,780,664 | 2/1957 | Serniuk | 260—669 X |

DELBERT E. GANTZ, *Primary Examiner.*

C. R. DAVIS, *Assistant Examiner.*